United States Patent [19]

Shindo et al.

[11] Patent Number: 4,674,364
[45] Date of Patent: Jun. 23, 1987

[54] SHIFT CONTROL SYSTEM OF AUTOMATIC TRANSMISSION

[75] Inventors: Yoshio Shindo; Kunihiro Iwatsuki, both of Toyota, Japan

[73] Assignee: Toyota Jidosha Kabushiki Kaisha, Toyota, Japan

[21] Appl. No.: 784,481

[22] Filed: Oct. 4, 1985

[30] Foreign Application Priority Data

Oct. 19, 1984 [JP] Japan ............................ 59-219455

[51] Int. Cl.⁴ ........................................... B60K 41/04
[52] U.S. Cl. ................... 74/867; 74/752 A; 74/869
[58] Field of Search ............... 74/866, 855, 856, 859, 74/867, 868, 869, 752 A, 740, 745, 865; 364/424.1

[56] References Cited

U.S. PATENT DOCUMENTS

| | | | |
|---|---|---|---|
| 2,923,175 | 2/1960 | Perkins | 74/740 |
| 2,932,988 | 4/1960 | Flynn et al. | 74/740 |
| 3,945,265 | 3/1976 | Bell et al. | 74/745 |
| 4,148,232 | 4/1979 | Moriya | 74/869 |
| 4,312,248 | 1/1982 | Sugimoto et al. | 74/866 |
| 4,367,528 | 1/1983 | Kawamoto et al. | 74/866 X |
| 4,368,650 | 1/1983 | Nomazawa et al. | 74/867 X |
| 4,411,174 | 10/1983 | Yokoi et al. | 74/865 X |
| 4,456,107 | 6/1984 | Ito et al. | 74/866 X |
| 4,495,576 | 1/1985 | Ito | 74/866 X |
| 4,527,447 | 7/1983 | Richards | 74/866 |

*Primary Examiner*—Leslie Braun
*Assistant Examiner*—David Novais
*Attorney, Agent, or Firm*—Oblon, Fisher, Spivak, McClelland & Maier

[57] ABSTRACT

In a shift control system of an automatic transmission, wherein the shift control system includes at least a first and a second transmissions capable of automatically switching speeds separately of one another, and the first and the second transmissions are shifted simultaneously or alternately, to thereby achieve multi-speed shifts, there is provided means for starting and completing changes in rpm for the shift of rotary members of the second transmission during the operation of changes in rpm for the shift of rotary members of the first transmission, particularly when the first transmission is low gear shifted and the second transmission is shifted simultaneously, whereby the automatic transmission as a whole is down shifted, so that the shift characteristics can be maintained satisfactorily.

12 Claims, 6 Drawing Figures

| | C1 | C2 | C0 | B0 | B1 | B2 | B3 | 2ND | 1ST |
|---|---|---|---|---|---|---|---|---|---|
| P.N | | | | | | | | | |
| R | | ○ | ○ | | | | ○ | LOW | RW |
| 1 | ○ | | ○ | | | | × | LOW | 1ST SPEED |
| 2 | ○ | | | ○ | | | × | HIGH | 1ST SPEED |
| 3 | ○ | | ○ | | × | ○ | | LOW | 2ND SPEED |
| 4 | ○ | | | ○ | × | ○ | | HIGH | 2ND SPEED |
| 5 | ○ | ○ | ○ | | | ○ | | LOW | 3RD SPEED |
| 6 | ○ | ○ | | ○ | | ○ | | HIGH | 3RD SPEED |

(B spans C1–B3; A spans 2ND–1ST)

FIG.6

SHIFT CONTROL SYSTEM OF AUTOMATIC TRANSMISSION

BACKGROUND OF THE INVENTION

1. Field of the Invention

This invention relates to a shift control system of an automatic transmission, and more particularly to improvements in a shift control system of an automatic transmission, wherein the shift control system includes at least a first and a second transmissions capable of automatically switching speeds separately of one another, and the first and the second transmissions are shifted simultaneously or alternately, to thereby achieve multi-speed shifts.

2. Description of the Prior Art

Along with a rapid spread in use of the automatic transmissions for motor vehicles in recent years, there have been commonly adopted such transmissions wherein a so-called over drive device, in which a transmission gear ratio is less than 1, is connected in series to the first transmission capable of automatic switching the shift speeds in association with a vehicle speed, a throttle opening, etc. as the second transmission.

Furthermore, there is also known such a transmission wherein, based on a function of the second transmission capable of switching from lower speed to higher speed and vice versa as the above-described over drive device, shift controls shown in FIG. 2A for example are performed, so that multi-speed shifts of six forward speeds can be achieved. This transmission is of such arrangement that a shift of the second transmission is actively cooperated with a shift of the first transmission, whereby the first transmission and the second transmission are shifted simultaneously or alternately, so that multi-speed shifts can be achieved.

The above-described arrangement makes it possible that the existing automatic transmission is utilized as the basis, and changes in design are minimized for manufacturing advantage, so that multi-speed shifts can be achieved. As the result, such advantages can be offered that the fuel consumption rate is improved, the power performance is bettered, and the burden of frictional materials is relieved due to making the speed shifts into multi-speed shifts, and the like.

Figure 2:
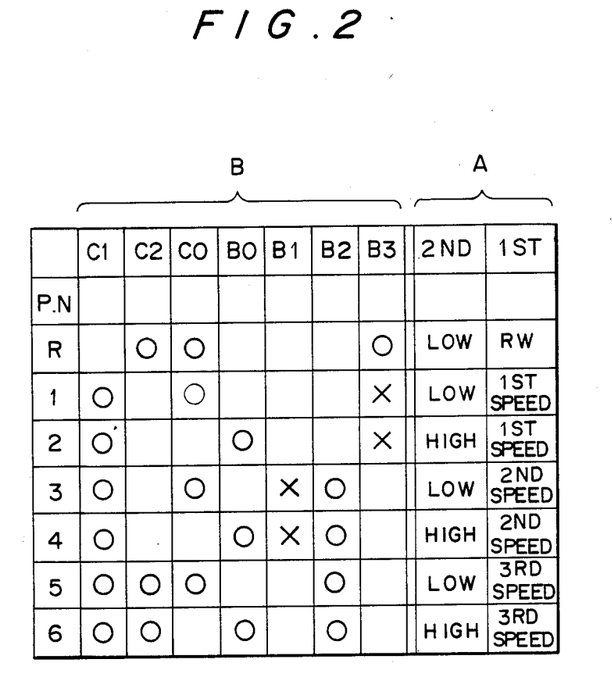
FIG. 2 is a chart showing the engaged state of the respective frictionally engaging devices of the aforesaid automatic transmission.

However, in the automatic transmission wherein the first and the second transmissions are shifted simultaneously or alternately to achieve the multi-speed shifts, as shown in FIG. 2, there occurs a case where the first transmission is low gear shifted and the second transmission is high gear shifted, for example, like a shift from a third speed to a second speed and like a shift from a fifth speed to a fourth speed, to thereby down shift the automatic transmission as a whole. At this time, if only the respective shifts are controlled separately of one another, an increase in shift shock is not avoidable. Furthermore, for example, while a down shift is in operation, the shift is started from an up shift, or an up shift after a down shift is performed, thus presenting such a disadvantage that there may be experienced the shift characteristics of a strange driving feeling.

SUMMARY OF THE INVENTION

The present invention has been developed to obviate the above-described disadvantages of the prior art and has its object that the provision of a shift control system of an automatic transmission, wherein a first transmission is down gear shifted and a second transmission is shifted simultaneously, whereby, when the automatic transmission as a whole is down shifted, shifts are reliably started from the down shift, the shift shock is low and the shift feeling of the up shift does not remain.

To this end, the present invention contemplates that, in a shift control system of an automatic transmission, wherein the shift control system includes at least first and second transmissions capable of automatically switching shift speeds separately of one another, and the first and the second transmissions are shifted simultaneously, to thereby achieve multi-speed shifts, there is provided means for starting and completing changes in rpm (revolutions per minute) for the shift of rotary members of the second transmission during the operation of changes in rpm for the shift of rotary members of the first transmission, when the first transmission is low gear shifted and the second transmission is shifted simultaneously, whereby the automatic transmission as a whole is down shifted. Also included are means for instructing the first transmission to switch speeds so that such rpm changes therein subsequently occur, and means for judging such changes. At least the starting of the starting of such changes in rpm in the second transmission is in response to such judging of such rpm changes in the first transmission.

A preferable specific form in the above-described arrangement is such that the start of changes in rpm for shifts of the rotary members of the first transmission is judged from a pressure switch adapted to be turned on when the hydraulic pressure of a frictionally engaging device associated with the aforesaid shifts reaches a predetermined pressure.

Or, the aforesaid start of changes in rpm for shifts of the rotary members of the first transmission is judged from whether or not a detected value reaches a predetermined value upon continuous detection of the hydraulic pressure of the frictionally engaging device associated with the aforesaid shifts.

Or, the aforesaid start is judged from a lapse of time measured by a timer referenced from a time of judgment of the aforesaid shift.

Or, the aforesaid start is judged from a lapse of time measured by a timer referenced from a time of command of the aforesaid shift.

Or, the aforesaid start is judged from the return of a piston of an accumulator of the frictionally engaging device associated with the aforesaid shift.

Or, the aforesaid start is judged from a torque of an output shaft.

Or, the aforesaid start is judged from a change in rpm of an engine revolution speed.

Or, the aforesaid start is judged from a change in rpm of a specific rotary member in the automatic transmission.

Additionally, the better setting of the timer can be obtained when the timer is set as commensurate to at least one of an engine load and a vehicle speed.

According to the present invention, changes in rpm of the rotary members of the second transmission for the shift are started and completed while the rotary members of the first transmission are performing the changes for the shift, whereby the shift shock is reduced and the feeling of only the down shift should necessarily be given to the driver.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of embodiment of the present invention with reference to the drawings.

Figure 1:
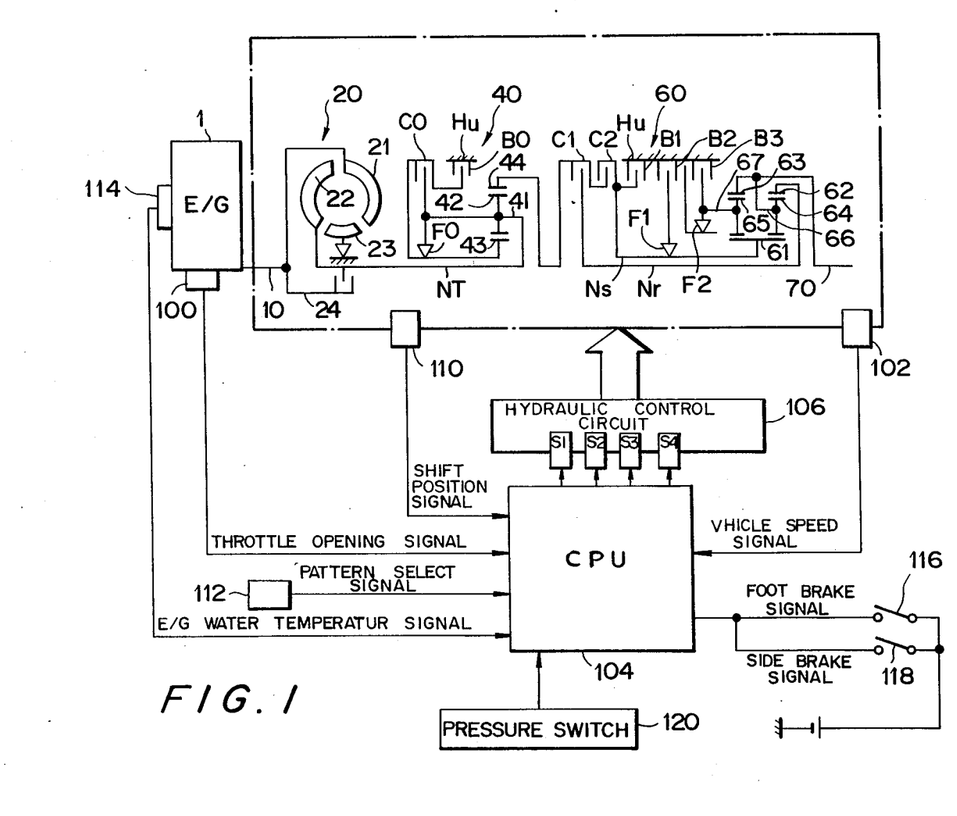
FIG. 1 is a general schematic view of the automatic transmission for a motor vechicle showing one embodiment of the shift control device of an automatic transmission according to the present invention.

FIG. 1 shows the general arrangement of the automatic transmission for a motor vehicle, to which is applied the present invention.

This automatic transmission includes a torque converter 20, a second transmission 40 and a first transmission 60 having three forward speeds and one rearward speed. The torque converter 20 includes a pump 21, a turbine 22, a stator 23 and a lock-up clutch 24. The pump 21 is connected to a crankshaft 10 of an engine 1, and the turbine 22 is connected to a carrier 41 of a planetary gear train in the second transmission 40.

In the second transmission 40, a planetary pinion 42 rotatably supported by this carrier 41 is in mesh with a sun gear 43 and a ring 44. Furthermore, a clutch C0 and a one-way clutch F0 are interposed between the sun gear 43 and the carrier 41. And a brake B0 is interposed between the sun gear 43 and a housing Hu.

In the first transmission 60, there are provided two rows including one on the front side and the other on the rear side as the planetary gear train. This planetary gear train includes a sun gear 61 being commonly used, ring gears 62 and 63, planetary pinions 64 and 65, and carrier 66 and 67.

The ring gear 44 of the second transmission 40 is connected to the ring gear 62 through a clutch C1. Furthermore, a clutch C2 is interposed between the ring gear 44 and the sun gear 61. Further, the carrier 66 is connected to the ring gear 63, and the carrier 66 and the ring gear 63 are connected to an output shaft 70.

On the other hand, a brake B3 and a one-way clutch F2 are interposed between the carrier 67 and the housing Hu. Further, a brake B2 is provided between the sun gear 61 and the housing Hu, through a one-way clutch F1. Furthermore, a brake B1 is interposed between the sun gear 61 and the housing Hu.

This automatic transmission has the above-described transmission section, and solenoid valves S1–S4 in a hydraulic control circuit 106 are driven and controlled in accordance with a shift pattern preset by a central processing unit (CPU) 104 to which are inputted signals from a throttle sensor 100 for detecting a throttle opening representing a load condition of the engine 1, a vehicle speed sensor 102 for detecting a vehicle speed, and the like. As a result, combinations of engagements between the clutches, brakes and the like as shown in the B portion in FIG. 2 are performed for shift control.

Additionally, in FIG. 2, indicated by marks "o" are engagements and marks "x" engagements only when an engine brake is used.

The solenoid valves S1 and S2 perform controls of shift of the first transmission 60, the solenoid valve S3 performs controls on the higher speed side and the lower speed side of the second transmission 40 and the solenoid S4 performs control of the lock-up clutch 24 of the torque converter 20, respectively.

Additionally, in FIG. 1, designated at 110 is a shift position sensor for detecting positions of N (Neutral), D (Drive) and R (Reverse), which are operated by the driver, 112 a pattern select switch for detecting position of E (Economical running), P (Power running) and the like, 114 a water temperature sensor for detecting a cooling water temperature of the engine, 116 a brake switch for detecting operations of a foot brake and 118 another brake switch for detecting operation of a side brake, respectively.

Here, in this embodiment, in addition to the above-described input signals, the CPU 104 has inputted thereto a signal from a pressure switch 120 for detecting a hydraulic pressure in an oil line directed to the brake B2, which will hereunder be described, in order to confirm the start of a change in rpm of the rotary members in the first transmission 60 due to a shift command.

Figure 3:
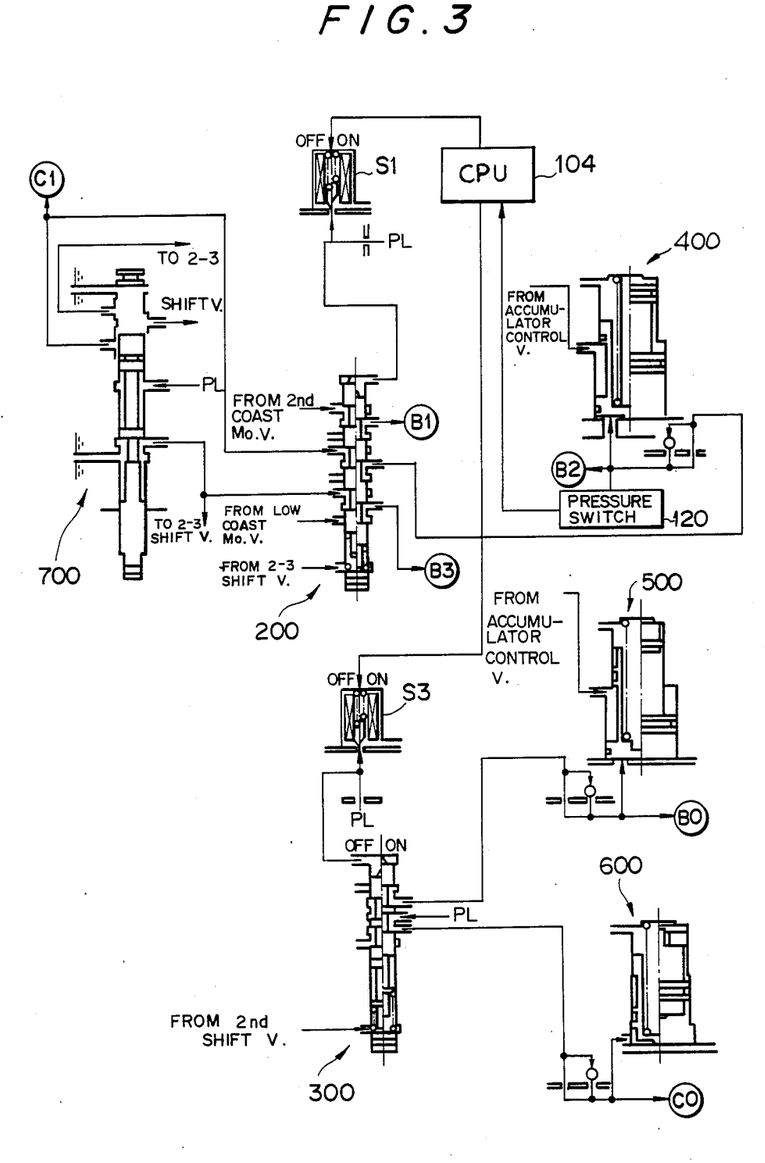
FIG. 3 is a diagram showing the essential portion of a hydraulic control circuit.

FIG. 3 shows the essential portions of the hydraulic control circuit 106.

In the drawing, designated at 200 is a first shift valve for switching between a first speed condition and a second speed condition of the first transmission 60, S1 a solenoid valve for controlling the switching of the first shift valve, 300 a third shift valve for switching between the higher speed side and the lower speed side of the second transmission 40, 400, 500 and 600 are respectively accumulators for B2, B0, and C0, S3 a solenoid valve for controlling the transition characteristics of the hydraulic pressure in oil lines to the brakes B2, B0 and the clutch C0, respectively, and 700 a manually operated valve interlocked with a shift lever operated by a driver. The arrangements and actions of these components are identical with the conventional ones, so that detailed description of the respective components need not be repeated. Additionally, the pressure switch 120 is provided on an oil line to the brake B2. This pressure switch 120 is preset to output an ON signal to CPU 104 when a hydraulic pressure PB2 in the oil line to the brake B2 reaches a predetermined pressure PB2' (which would better be set as commensurate to the throttle opening) at which the rotary members of the first transmission 60 start changes in rpm.

Figure 4:
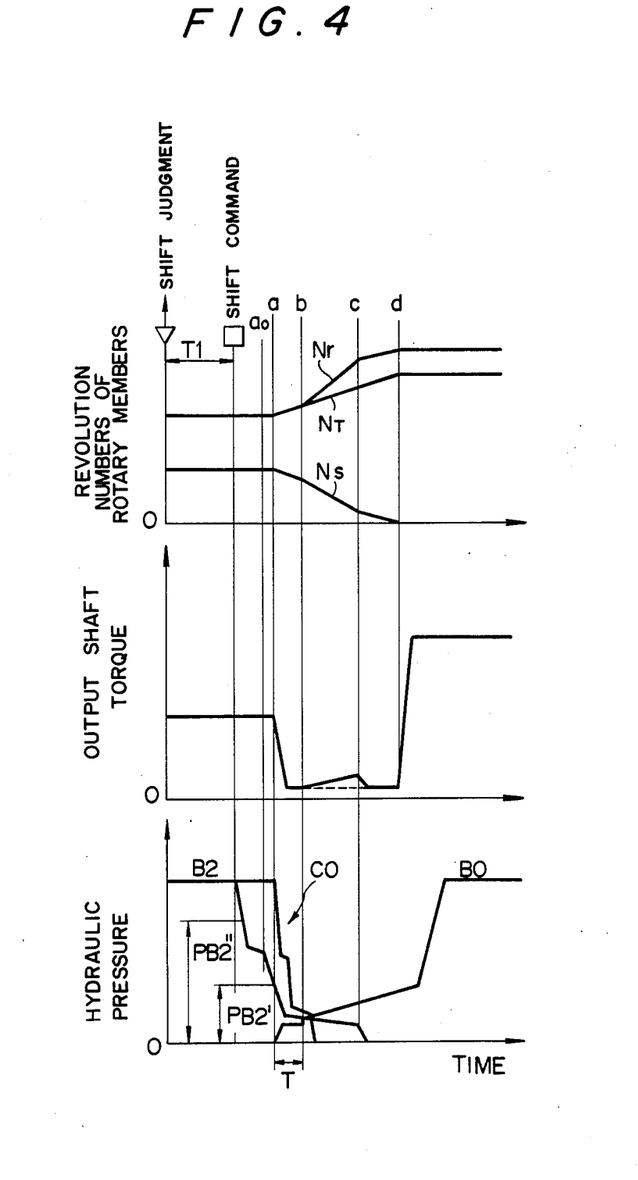
FIG. 4 is a diagram of shift transmission characteristics.
Figure 5:
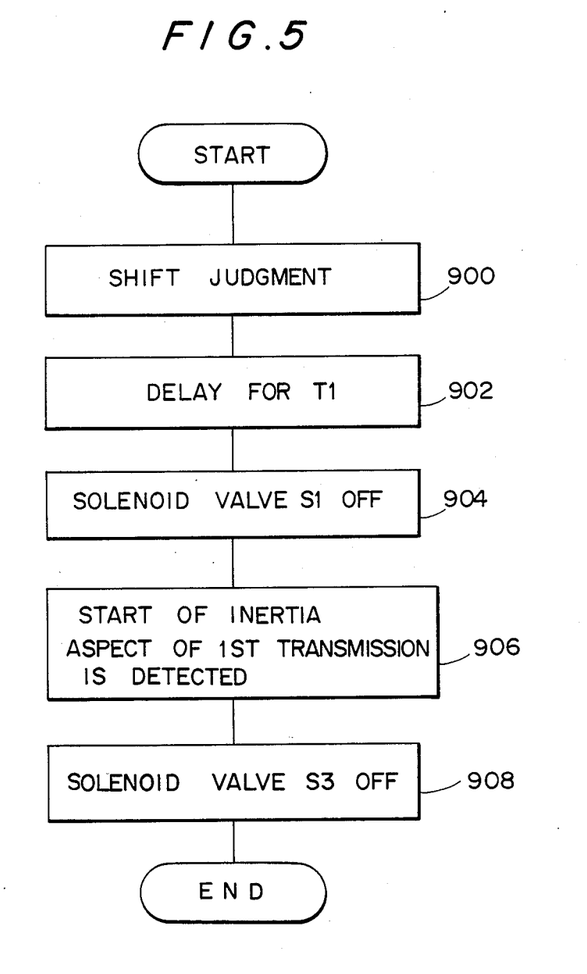
FIG. 5 is a flow chart showing the steps of shift control.

Description will hereunder be given of action of this control system with reference to FIGS. 4 and 5. In the case where the first transmission 60 is low gear shifted and the second transmission 40 is shifted simultaneously, whereby, when the automatic transmission as a whole is down shifted, there are various shifts as apparent from FIG. 2. However, since the gist of the invention relating to shifts is common to all of these shifts, explanation is given of a shift from the third speed to the second speed as an example, here.

Firstly, in Step 900, a judgment of shift (judgment of shift from the third speed to the second speed) is made from a vehicle speed, a throttle opening or a signal of a pattern select switch, etc. through an action similar to a conventional one. Upon making this judgment, a delay for a predetermined time duration T1 is taken in Step 902, and thereafter, the solenoid valve S1 is turned off to switch the first shift valve 200 for controlling the first transmission 60 (Step 904). The reason why the delay for a time duration T1 is taken is that, when two or more judgments of shift are made for a short period of time, only the last judgment should be selected Turn-off of the solenoid valve S1 firstly lowers the hydraulic pressure PB2 of the brake B2, the first transmission 60 begins to be low gear shifted at a predetermined pressure PB2', whereby changes in rpm of the respective rotary members of the first transmission 60 begin (at point a).

On the other hand, when the pressure switch 120 is actuated at the predetermined pressure PB2' due to a decrease of the hydraulic pressure PB2 of the brake B2, the CPU 104 confirms the start of an inertia phase (the period of time, during which changes in rpm of the respective rotary members are performed) of the first transmission 60 in Step 906. When the inertia phase is confirmed, a shift command is delivered to the solenoid valve S3, and the third shift valve 300 is switched, whereby the hydraulic line pressure is fed to the brake B0 and the hydraulic pressure of the clutch C0 is drained. As the result, high gear shift of the second transmission 40 is started at a point b and the engagement is completed at a point c.

On the other hand, the first transmission 60, which has begun the inertia phase at the point a, completes the inertia phase at a point d where the rotation (Refer to the revolution numbers of the rotary members) of the output shaft of the turbine 22 comes into synchronism therewith.

As a result, the second transmission 40 starts changes in rpm after the start of changes in rpm of the first transmission 60, and completes the changes in rpm thereof while the first transmission 60 is performing the changes in rpm.

In the foregoing, description has been given of the arrangement and action when the shift is performed from the third speed to the second speed, however, the gist of the invention is applicable to a shift from the fifth speed to the fourth speed or another shift wherein the first transmission 60 is low gear shifted and the second transmission 40 is shifted simultaneously, whereby the automatic transmission as a whole is down shifted.

Figure 6:
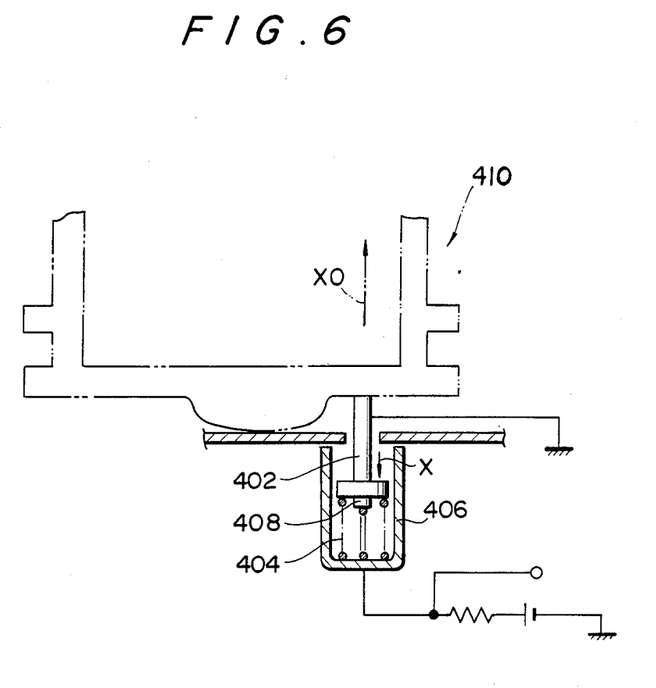
FIG. 6 is an enlarged view of a portion indicated by an arrow VI in FIG. 3, showing the portion of the hydraulic control circuit in another embodiment.

Furthermore, in the above embodiment, as the means for detecting the inertia phase of the first transmission 60, the pressure switch 120 adapted to be turned on when the hydraulic pressure PB2 of the brake B2 reaches the predetermined pressure PB2' has been used, the means for detecting the inertia phase of the first transmission 60 according to the present invention need not necessarily be limited to this, and, for example, the hydraulic pressure of the brake B2 may be continuously detected by a hydraulic pressure sensor. In addition, in the case where the inertia phase is detected through pressure by use of the pressure switch 120, the hydraulic sensor or the like as described above, when a time duration T (corresponding to a deflection region of a return spring of a brake) shown in FIG. 4 is prolonged, the high gear shift of the second transmission 40 may not be completed during the inertia phase of the first transmission 60. In consequence, the predetermined pressure may be set at PB2" which is higher. Furthermore, as another detecting means, the detection may be made by a timer (which would better be set as commensurate to the throttle opening) referenced from an OFF time of the solenoid valve S1 (at the time of a shift command) or the time of shift judgment. Or, as shown in FIG. 6, the return of the accumulator 400 may be detected. More specifically, in FIG. 6, designated at 402 is a rod with a stopper, 404 a return spring, 406 a housing and 408 a contact point. When an accumulator piston 410 returns in a direction indicated by an arrow X0 due to the drain of the brake B2, the rod 402 is urged in a direction indicated by an arrow X against the return spring 404, whereby the rod 402 comes into contact with the contact point 408, so that the operation of the accumulator 400 can be detected (a point $a_0$ in FIG. 4). In this case, it is the time before the inertia phase of the first transmission 60 is started, whereby the start of inertia is detected by a timer referenced from the time of detection of the accumulator 400 and set as commensurae to the throttle opening.

Additionally, the changes in rpm of the engine, or the respective rotary members of the automatic transmission may be detected directly, and, the detection may be made from the torque of the output shaft of the automatic transmission.

And, in the above embodiment, the throttle opening has represented "the engine load", however, the present invention need not necessarily be limited to this, and, for example, the output shaft torque of the engine detected by a torque sensor may represent "the engine load".

What is claimed is:

1. A shift control system of an automatic transmission, where said system includes at least first and second transmissions capable of automatically switching speeds separately of one another, said first and said second transmissions being capable of being shifted simultaneously, to thereby achieve multi-speed shifts, comprising:

means for instructing said first transmission to switch speeds such that said first transmission is low shifted, whereby changes in rpm of rotary members of said first transmission subsequently occur;

means for judging said changes in rpm of rotary members of said first transmission; and means for initiating rpm changes of rotary members of said second transmission in response to said judgment of changes in rpm for the shift of rotary members of said first transmission such that said first and second transmissions are shifted simultaneously and said automatic transmission as a whole is down shifted.

2. A shift control system of an automatic transmission as set forth in claim 1 including means for completing rpm changes of rotary members of said second transmission during operation of changes in rpm for the shift of rotary members of said first transmission.

3. A shift control system of an automatic transmission as set forth in claim 2, wherein said means for judging comprise a pressure switch adapted to be turned on when the hydraulic pressure of a frictionally engaging device associated with said shifts reaches a predetermined pressure.

4. A shift control system of an automatic transmission as set forth in claim 2, wherein said means for judging comprise means for determining whether or not a detected value reaches a predetermined value upon continuous detection of the hydraulic pressure of a frictionally engaging device associated with said shifts.

5. A shift control system of an automatic transmission as set forth in claim 2, wherein said means for judging comprise a timer for determining a lapse of time referenced from a time of judgment of said shift.

6. A shift control system of an automatic transmission as set forth in claim 2, wherein said means of judging comprise a timer for determining a lapse of time referenced from a time of command of said shift.

7. A shift control system of an automatic transmission as set forth in claim 2, wherein said means of judging comprise means for determining return of a piston of an accumulator of a frictionally engaging device associated with said shift.

8. A shift control system of an automatic transmission as set forth in claim 2, wherein said means of judging comprise means for determining a torque of an output shaft.

9. A shift control system of an automatic transmission as set forth in claim 2, wherein said means of judging comprise means for determining a change in rpm of an engine revolution speed.

10. A shift control system of an automatic transmission as set forth in claim 2, wherein said means of judging comprise means for determining a change in rpm of a specific rotary member in said automatic transmission.

11. A shift control system of an automatic transmission as set forth in claim 5, wherein said timer is set as commensurate to at least one of an engine load and vehicle speed.

12. A shift control system of an automatic transmission as set forth in claim 6, wherein said timer is set as commensurate to at least one of an engine load and vehicle speed.

* * * * *